(No Model.)
G. G. F. BOSWELL.
BICYCLE WHEEL.
No. 478,735.  Patented July 12, 1892.
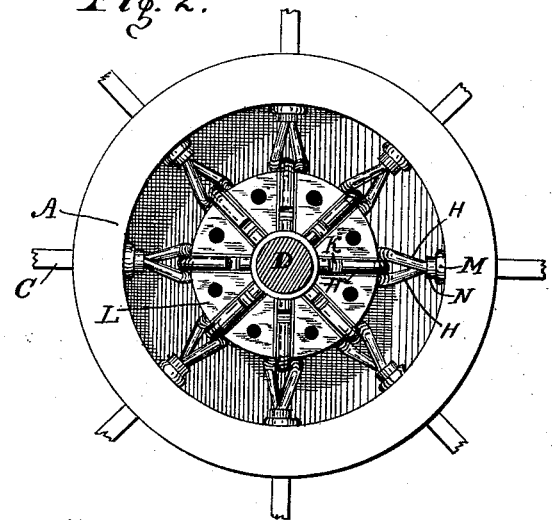
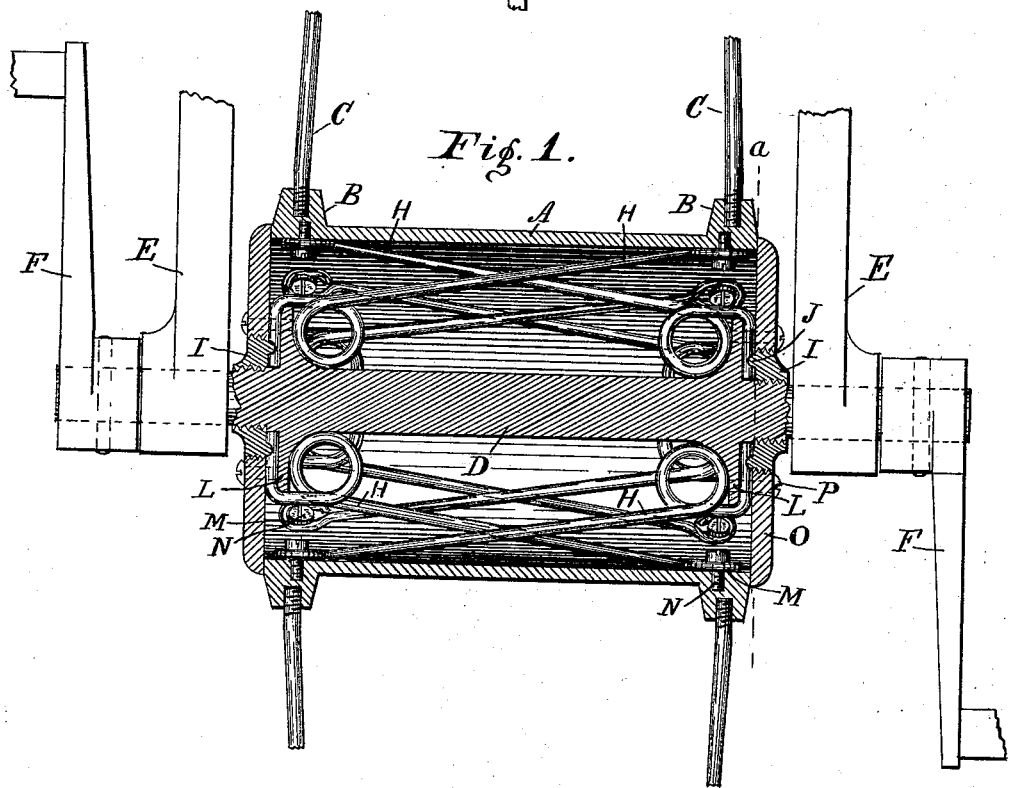
WITNESSES:
H. P. Hood
V. M. Hood
INVENTOR
George G. F. Boswell

UNITED STATES PATENT OFFICE.

GEORGE G. F. BOSWELL, OF INDIANAPOLIS, INDIANA, ASSIGNOR OF ONE-FIFTH TO JOSEPH E. BOSWELL, OF SAME PLACE.

BICYCLE-WHEEL.

SPECIFICATION forming part of Letters Patent No. 478,735, dated July 12, 1892.

Application filed September 30, 1891. Serial No. 407,212. (No model.)

*To all whom it may concern:*

Be it known that I, GEORGE G. F. BOSWELL, a citizen of the United States, residing at Indianapolis, in the county of Marion and State of Indiana, have invented a new and useful Improvement in Bicycle-Wheels, of which the following is a specification.

My invention relates to an improvement in bicycle-wheels.

The object of my improvement is to provide a yielding connection between the driving-wheel of a bicycle and the driving-shaft, which forms the axis of said wheel and a support for the frame of the machine.

The accompanying drawings illustrate my invention.

Figure 1 represents a central longitudinal section of the hub and driving-shaft of a bicycle-wheel containing my improvement. Fig. 2 represents a transverse section at $a$, Fig. 1.

The hub of the wheel consists of a hollow cylinder A, open at both ends and having radial flanges B, in which the spokes C are mounted. Extending longitudinally through said hub is the driving-shaft D, on which the frame of the machine, represented by the divided ends E E of the frame, is supported.

In bicycles of the standard or "high wheel" class the pedal-cranks F F are secured directly to the shaft D, but in the "Safety" or low-wheel class the sprocket-wheel, on which the driving-chain is mounted, takes the place of the pedal-cranks.

Shaft D is connected with the interior of the hub A by means of two series of coiled springs H H. Said springs are arranged radially at regular intervals around the shaft at each end and are each rigidly secured to the shaft at one end by means of a clamping-plate I, having on its inner face a projecting annular rib J, which engages a corresponding recess K, formed near the ends of each of the springs. Shaft D is provided near each end of the hub with collars L L, which form supports for the springs H and against which the springs are clamped by the plates I I, which are screwed upon suitable threads formed upon the shaft.

The free end of each of the springs is provided with a loop M, having a slotted opening through which a screw N passes into the hub, the springs being thereby secured to the interior of the hub in such a manner as to permit a slight endwise movement of the loop upon the hub.

The open ends of the hub are covered, respectively, by circular plates O O, which are screwed upon the peripheries of the clamping-plates I I and are further secured in position by screws P, passing into the collars L L, thus aiding in firmly securing the fixed ends of the springs. In operation the wheel is driven by the rotation of shaft D, the first movement of which is communicated with a yielding force to the wheel by the springs H H. When the wheel strikes an obstruction, the shock is communicated with a yielding force through the springs H to the shaft D and frame E.

It will be understood that I do not wish to confine myself to the particular form of springs herein shown and described, nor to the specific manner of securing the springs to the driving-shaft and to the hub.

The essential feature of my invention is the yielding connection between the hub of the wheel and the driving-shaft forming the axis of the wheel and a support for the frame.

I claim as my invention.

1. In a bicycle-wheel, the combination of the hollow cylindrical hub, the driving-shaft extending axially through said hub, the two series of springs arranged at opposite ends of said shaft, one end of each of said springs being rigidly secured to the shaft and having its opposite end attached to the interior surface of the hub, whereby a yielding connection is formed between the driving-shaft and the wheel-hub, substantially as set forth.

2. In a bicycle-wheel, the combination of the hollow cylindrical hub, the shaft having collars L L, springs H, and clamping-plates I I, all arranged to co-operate in the manner and for the purpose set forth.

GEORGE G. F. BOSWELL.

Witnesses:
H. P. HOOD,
V. M. HOOD.